(12) United States Patent
Warriner

(10) Patent No.: US 10,295,028 B2
(45) Date of Patent: May 21, 2019

(54) LINEAR ACTUATOR

(71) Applicant: Blockwise Engineering LLC, Tempe, AZ (US)

(72) Inventor: Jeremiah J. Warriner, Tempe, AZ (US)

(73) Assignee: Blockwise Engineering LLC, Tempe, AZ (US)

( * ) Notice: Subject to any disclaimer, the term of this patent is extended or adjusted under 35 U.S.C. 154(b) by 470 days.

(21) Appl. No.: 15/220,193

(22) Filed: Jul. 26, 2016

(65) Prior Publication Data

US 2018/0031088 A1 Feb. 1, 2018

(51) Int. Cl.
*F16H 21/04* (2006.01)

(52) U.S. Cl.
CPC .................... *F16H 21/04* (2013.01)

(58) Field of Classification Search
CPC ................ F16H 21/04; F16H 21/02
See application file for complete search history.

(56) References Cited

U.S. PATENT DOCUMENTS

| | | |
|---|---|---|
| 2,770,973 A | 11/1956 | Wildhaber |
| 3,295,808 A | 1/1967 | Webb |
| 3,307,810 A | 3/1967 | Lichowsky |
| 3,971,599 A | 7/1976 | Shio |
| 4,421,207 A | 12/1983 | Falconer |
| 4,607,492 A | 8/1986 | Demus et al. |
| 5,149,222 A | 9/1992 | Yeakley |
| 5,213,436 A | 5/1993 | Fichtner et al. |
| 5,431,309 A | 7/1995 | Ophardt |
| 5,439,294 A | 8/1995 | Rixen et al. |
| 5,663,486 A | 9/1997 | Braam et al. |
| 5,802,914 A * | 9/1998 | Fassler ............... F16F 15/02 267/158 |
| 6,133,670 A * | 10/2000 | Rodgers ............ B81B 3/0021 310/309 |
| 6,465,929 B1 * | 10/2002 | Levitan ............ B81B 3/0037 310/309 |
| 6,541,892 B2 * | 4/2003 | Hoen .................. H02N 1/008 310/309 |
| 6,666,611 B2 * | 12/2003 | Phillips ............... F16C 11/12 267/160 |
| 6,695,297 B2 | 2/2004 | Hoen et al. |
| 6,947,188 B2 * | 9/2005 | Miles ................ B81B 3/0037 359/224.1 |

(Continued)

*Primary Examiner* — David M Fenstermacher
(74) *Attorney, Agent, or Firm* — Invention To Patent Services; Alex Hobson

(57) ABSTRACT

A linear actuator provides linear displacement of an actuator plate. The linear actuator includes a set of base flexures that extend from a base plate to an actuator plate and a set of arm flexures that extend from a base arm to an actuator arm. The base arm of the base frame extends up perpendicularly from the base plate and the actuator arm, of the actuator frame, extends perpendicularly from the actuator plate. A base frame and actuator frame may be elbows that are arranged to form a box with the base flexures and arm flexures extending orthogonally within the cavity of the box. A flexure may include an extension element such as a pleated portion of the flexure that has stored length that enables the flexure to extend to increase the linear displacement region. The arm flexures prevent the base flexures from following a radius of motion.

21 Claims, 13 Drawing Sheets

(56) References Cited

U.S. PATENT DOCUMENTS

| | | | |
|---|---|---|---|
| 7,896,623 B2* | 3/2011 | Hell | F04B 35/045 |
| | | | 248/605 |
| 8,601,630 B2* | 12/2013 | Benning | F16C 29/002 |
| | | | 15/167.1 |
| 9,200,689 B2 | 12/2015 | Awtar et al. | |
| 9,281,111 B2* | 3/2016 | Higuchi | H01F 7/081 |
| 9,370,865 B1* | 6/2016 | Vangal-Ramamurthy | |
| | | | B23P 19/102 |
| 2003/0174418 A1 | 9/2003 | Tseng et al. | |
| 2004/0109620 A1 | 6/2004 | Zernickel et al. | |
| 2005/0052723 A1* | 3/2005 | Watanabe | B81B 3/0037 |
| | | | 359/290 |
| 2005/0062361 A1* | 3/2005 | Harley | H02N 1/008 |
| | | | 310/309 |
| 2008/0121659 A1 | 5/2008 | Ophardt | |
| 2010/0264777 A1* | 10/2010 | Medhat | B81B 3/0037 |
| | | | 310/300 |
| 2012/0163741 A1 | 6/2012 | Lee | |
| 2015/0260220 A1 | 9/2015 | Owada et al. | |

* cited by examiner

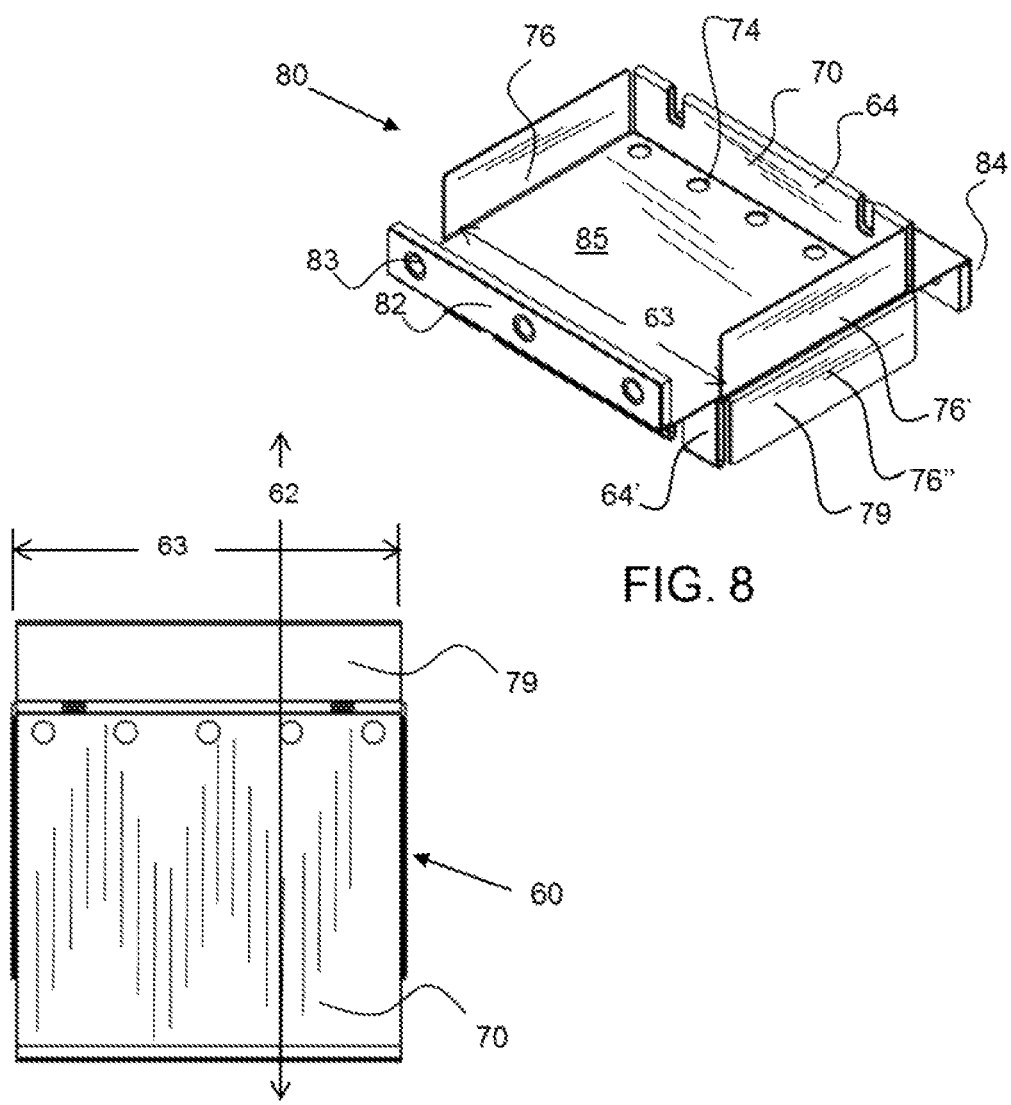
FIG. 8
FIG. 9
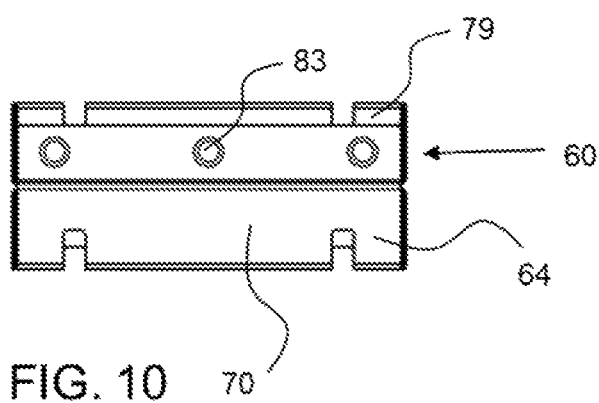
FIG. 10

LINEAR ACTUATOR

BACKGROUND OF THE INVENTION

Field of the invention

The invention is directed to linear actuators and particularly linear actuators comprising flexures.

Background

There are many applications in which linear motion, guidance is necessary and accordingly there are many different technologies for enacting this linear guidance. One popular method of linear guidance is the use of a carriage, coupled by rolling elements, usually balls or rollers, on a rail. Another commonly used method, is the use of plain bearings, or sliding elements that are guided by geometrical constraints such as a brass bushing on a rod or a plastic block in a rectangular channel. These types of guidance systems suffer from a few drawbacks that limit their use in a number of applications. The first disadvantage of these conventional systems is that they have friction that limits the accuracy of any positioning system that incorporates such. A second drawback, is that they wear with use and consequently lose accuracy and, can need repair or replacement These systems often require periodic maintenance such as lubrication, or backlash adjustment. Another disadvantage is these systems tend to be heavy, with the rails and carriages massive enough to handle the required loads. Lastly, conventional guidance systems, especially precision systems, tend to be expensive. The expense is rooted first in the amount and type of material they require, and two, in the careful manufacturing that is necessary to achieve the tolerances required for such devices.

Compliant mechanisms, that use, a configuration of flexures as the guidance system, are a class of devices that address many of the short-comings of conventional linear motion guidance systems. Flexures inherently have virtually no friction when used in the elastic region of the flexure material. If a material with an endurance limit is used as the flexures, and the mechanism is designed such that the stresses in the flexure remain, below the endurance limit, infinite operating life can be reasonably expected. A third advantage is that they are lightweight, since instead of large masses of material, there are thin bent sheets. And in a similar vein, the thin bent sheets tend to be much less expensive to manufacture than precision ground rails and other parts that make up a conventional system.

There are, however, certain drawbacks of flexure systems. One is they tend to allow for only relatively small deflections. Two, many configurations have parasitic motion, that is, instead of only allowing motion in only a linear direction, the actual guided motion may move in, an arc or some other pattern that has components of motion that are orthogonal to the desired direction of travel. Third, compliant linear motion guidance systems tend to be less stiff in the constraint directions than their conventional counterparts. Also, compliant systems have a spring force that tends'to return the moving element to a neutral position. This fact can be an advantage in some designs and undesirable in others.

It is therefore desirable and the object of the current invention to gave a linear compliant guidance system that capitalizes on, the advantages inherent in flexure systems, yet has minimal or no parasitic motion, allows for relatively large deflections, is extremely stiff in the directions of constraint, flexible in the motion direction, compact in design and inexpensive to manufacture.

SUMMARY OF THE INVENTION

The invention is directed to a linear actuator comprising a unique configuration of flexures that are arranged orthogonally to each other. In an exemplary embodiment, a first set of flexures are arranged between a base plate and an actuator plate and a second set of flexures are arranged orthogonally to said first set and restrict the first set from moving about moving about a radius. In an exemplary embodiment, the first and second set of flexures comprise an extension element that has stored length that enables the flexure to extend and therefore maintain a linear plane of motion along the axis of motion.

An exemplary linear actuator comprises a base frame and an actuator frame that form two parallel component planes for attachment of the flexures. The base frame comprises a base plate and a base arm, wherein said base arm extends substantially perpendicularly from the base plate. The actuator frame comprises an actuator plate and an actuator arm, wherein said actuator arm extends substantially perpendicularly from the actuator plate and towards the base plate. The base plate and actuator plate are parallel and offset from each other and the base, arm and actuator arm are parallel and offset from each other. In an exemplary embodiment, the base plate and base arm form a box with an opening in the middle wherein the flexures extend across orthogonal to each other. In an exemplary embodiment, a set, of base flexures extend between the base plate and the actuator plate and a set of arm flexures extend between the base arm and the actuator arm. The base flexures have a base plate end that is attached to the base plate and an actuator plate end that is attached to the actuator plate. The actuator plate end of the base flexure moves with the actuator plate to allow movement of the actuator plate.

A linear actuator with only a set of base flexures extending between the base plate and an actuator plate, not including any arm flexures, would follow a radius as the base flexures pivot about their attachment to the base plate. However, the unique configuration of the arm flexures extending orthogonally to the base flexures prevents this type of non-linear motion. The arm flexures are attached to both the base arm, a fixed body, and extend across to the actuator arm, which is attached to the actuator plate and moves with the actuator plate. Again, the arm flexures extend perpendicularly to the base flexures. Motion of the actuator plate also moves the actuator arm and thereby requires the arm flexures, or the actuator arm end of the arm flexures to pivot and move. This causes resistance to the base flexures moving in an arc and forces the base flexures to move in a linear axis of motion.

In an exemplary embodiment, the base and/or arm flexures comprise an extension element that has stored length. For example, an extension element may be a bent, folded or pleated portion of a flexure body. The stored length is the length of the flexure within the bend, fold or pleat, wherein straightening, of the bend or fold elongates the flexure. In an exemplary embodiment, all of the flexures comprises an extension element. The extension element enables the actuating end, the actuator plate end and actuator arm end, to move in a linear axis as opposed to along a radius. The orthogonal orientation of the two sets of flexures further requires and forces the base flexures to provide linear motion of the actuator plate.

Flexures may be formed from a planar or a sheet of material, such as metal that can be deflected without damage. In an exemplary embodiment, the flexures are steel sheets that comprise a fold, wherein a portion of the sheet is folded from the plane of the sheet to provide an extension element. A flexure may also comprise a stiffener, or an element that resists deformation or flexing of the flexure in a direction other than the deflection direction required for the linear motion actuation. An extension element, such as a pleat of the flexure reduces the stiffness in an off axis as a portion of the pleat may open up on one end of the flexure and compress or not open on the opposing end and thereby allow displacement, or bending of the flexure in an off axis. To increase the stiffness of the flexure, a stiffener may be configured on the flexure to prevent the flexure from being bent across the plane of the flexure body, or in a direction not aligned with the length axis of the flexure. A stiffener may be a rib that extends along at least a portion of the length of the flexure, or along one or more edges of the flexure. In an exemplary embodiment, a stiffener may extend along either edge of the flexure, and may be formed from a folded portion of a flexure. For example, tabs that extend from the edges of the flexure body may be folded to be substantially perpendicular to the flexure body to stiffen the flexure.

In an exemplary embodiment, a flexure, is composed of a first flexure component and, a second flexure component that are attached to each other. A first and second flexure components may be attached to each other by a first and second flexure attachment that are offset by a flexure attachment offset length. The area between the attachments may be, an extension zone of the flexure, wherein at least one of the flexure components comprises an extension element between the flexure attachments. This configuration of the extension element between the attachments enables the flexure to elongate between the flexure attachments, thereby producing the extension zone. In an exemplary embodiment, both the first and second flexure components comprise an extension element between the flexure attachments. Flexure attachments may comprise welds, between the two flexure components, or fasteners including, but not limited to screws, bolts, rivets, glue and the, like. It is to be understood that the two flexure components may be made from a single piece of material through machining, molding and the like, wherein the flexure attachments are integral attachments of the single material.

In still another exemplary embodiment, stiffeners extend substantially along the extension zone, or between the flexure attachments and along either side of each flexure component; thereby providing four stiffeners per flexure. In an exemplary embodiment, both the base flexures and the arm flexures comprise two flexure components, two extension elements, and four stiffeners per flexure.

The set of base flexures may be configured outside of, or more proximal the ends of the linear actuator than the arm flexures. In another embodiment the arm flexures are configured outside of, or more proximal the ends of the linear actuator than the base flexures. In still another embodiment, the base and arm flexures are, configured in an alternating configuration, wherein on one end of the, linear actuator the base flexure, is more proximal to the, end and on the other end of the linear actuator the arm flexure is more proximal to the end.

An actuator device may be configured within the opening created by the base frame and actuator frame and may be centrally located, wherein it is configured between a base and arm flexure on either side of the actuator device. For example, a linear motor may be configured centrally within the linear actuator, be mounted or attached to the base frame with the actuator element coupled to the actuator frame, such as the actuator plate or actuator arm. Movement of the actuator element may then move the actuator frame and the flexures will force the actuator frame to move in a linear motion. In an alternative exemplary embodiment, an actuator device comprises an actuator element that is forced against one or more of the flexures.

A linear actuator may have a linear displacement region, or a displacement along the axis of motion that remains substantially within a plane of motion, wherein the actuator plate remains within 5 mm of the plane of motion, preferably within about 3 mm, and more preferably within 2 mm, and even more preferably within 1 mm of the plane of motion. The plane of motion is a plane defined by the actuator plate and extends in the direction of the linear axis of motion of the linear actuator. The linear displacement region may be controlled by the length of the flexures, wherein a longer flexure will provide a larger linear displacement region that a shorter flexure. A linear displacement region may be defined by a percentage of length of the base flexures. For example, a linear displacement region may be at least 10% of the length of the base flexures, or about 20% or more of the length of the base flexures, or about 26% or more, of the length of the base flexures, and any range between and including the percentages provided. The linear displacement region may be impacted by the geometry of the extension element. An extension element having a larger stored length, or a pleated geometry, or depth of the bent portion of the flexure that is large proportionally, may provide a larger linear displacement region, whereby the larger pleat can extend further than a smaller pleat. In cases where the extension element has a larger pleat depth, or larger stored length, the linear displacement region may be about 35% or more, about 40% or more, about 45% or more, or about 50% or more of the length of the base flexure, and any range between and including the percentages provided. A linear displacement region may be limited to about 50% or less of the length of a base flexure. For example, a linear actuator may have a pair of base flexures having a length of 50 mm and the linear displacement region of about 13 mm for a first extension element geometry having an extension element with a first stored length, and about 25 mm for base flexures having a second and larger extension element geometry and more stored length.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 8 shows a perspective view of an exemplary flexure portion of the present invention having a first and second flexure component.

FIG. 9 shows front view of an exemplary flexure portion of the present invention having a width.

FIG. 10 shows top down view of an exemplary flexure portion of the present invention.

DETAILED DESCRIPTION OF THE ILLUSTRATED EMBODIMENTS

Figure 1:
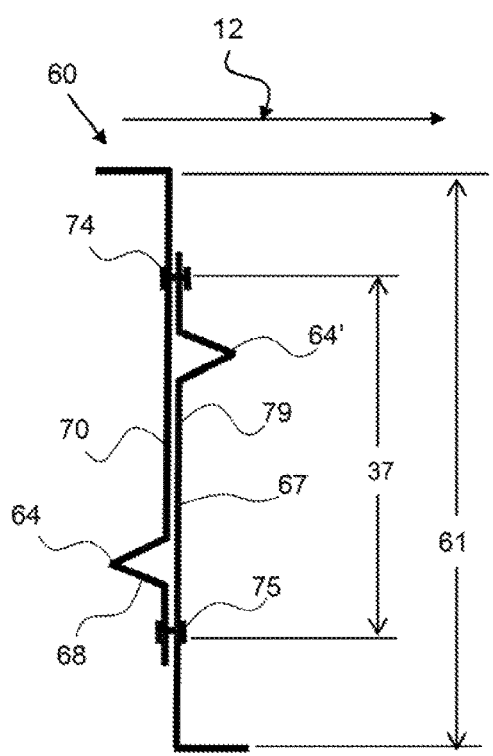
FIG. 1 shows a side view of an exemplary flexure portion of he present invention having a first and second flexure component.
Figure 2:
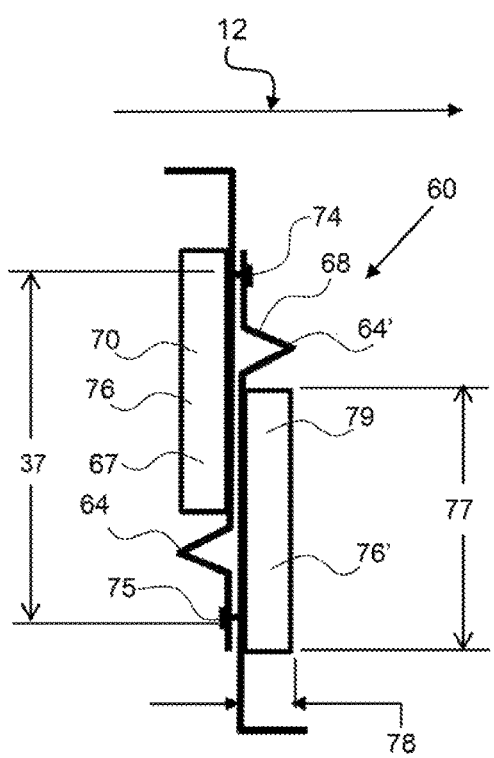
FIG. 2 shows a side view of an exemplary flexure portion of the present invention having a first and second flexure component.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises,'" "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the, scope of the invention. This description should be read, to include one or at least one and the singular also includes the plural unless it is obvious that it is meant otherwise.

In cases where the present, specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Figure 23:
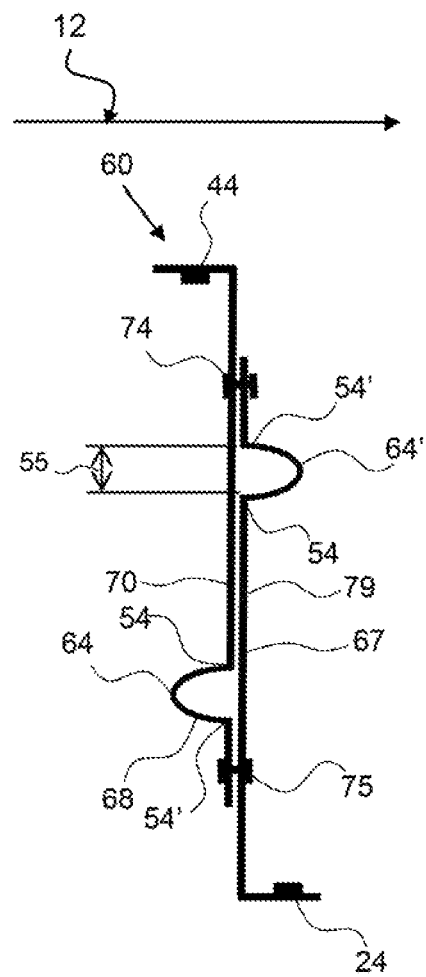
FIG. 23 shows a side view of an exemplary flexure portion of the present invention having a first and second flexure component and a rounded or curved extension elements.
Figure 24:
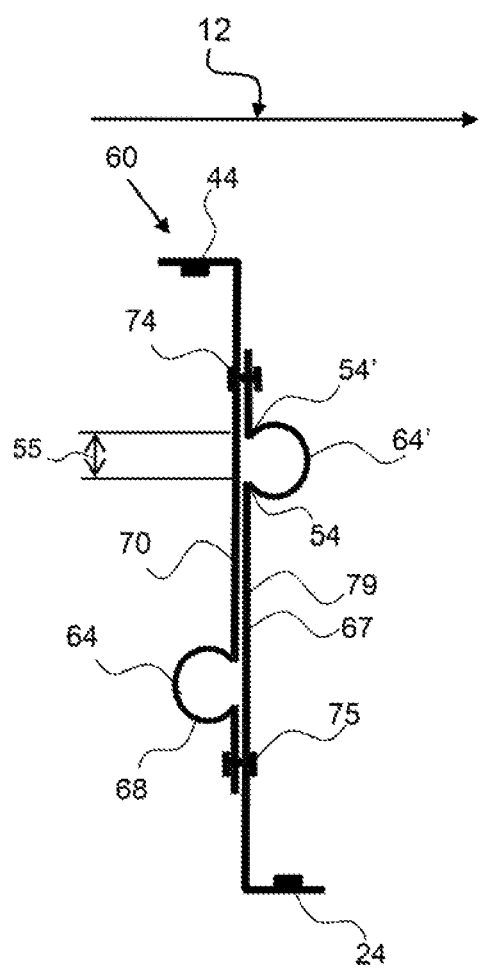
FIG. 24 shows a side view of an exemplary flexure portion of the present invention having a first and second flexure component and a rounded or curved extension elements.

As shown in FIG. 1, an exemplary flexure 60 of the present invention has a first flexure component 70 and second flexure component 79 that are attached at a first flexure attachment 74 and a second flexure attachment 75. The flexure attachment offset length 37 is the distance between the two flexure attachments and this area of the flexure, between the two attachments is the extension zone 67 of the flexure. The extension zone 67 of the flexure is the portion of the flexure that can extend to expand the overall length of the flexure to allow linear motion. An extension element 64, 64' is configured along the length of the first and second flexure components respectively and between the two flexure attachments. The extension elements are bent, folded or pleated portions of the flexure component and act to store length 68. As shown in FIG. 1, the extension elements are bent to form a fold or pleat but may be rounded having an arced shaped or circular geometry as shown in FIGS. 23 and FIG. 24 respectively. The extension element provides elongation of the flexure component when tension is applied. The flexure 60 has a length 61 from a first end to a second end. The stored length is the length of the folded portion of the flexure. The flexure component may be a formed sheet or planar piece of material, such as metal or plastic.

As shown in FIG, 2, an exemplary flexure portion 60 has a first flexure component 70 and second flexure component 79. Each flexure component has a stiffener configured along the edge of the flexure component and substantially between the flexure attachment 74 and extension element 64', for example. The stiffener 76 of the second flexure component 79 is substantially between the second flexure attachment 75 and the extension element 64' of the second flexure component and has a stiffener length 77, and width 78. The length and width of the stiffener may be sufficient to provide adequate stiffening of the flexure to prevent motion in directions other than the axis of motion 12. The stiffener component may be a bent portion of the formed piece of metal, for example, and acts to prevent deflection of the flexure in a direction other than the axis of motion. The configuration of the extension elements along with the stiffener encourage the flexure to move and extends to enable linear motion along a plane.

Figure 3:
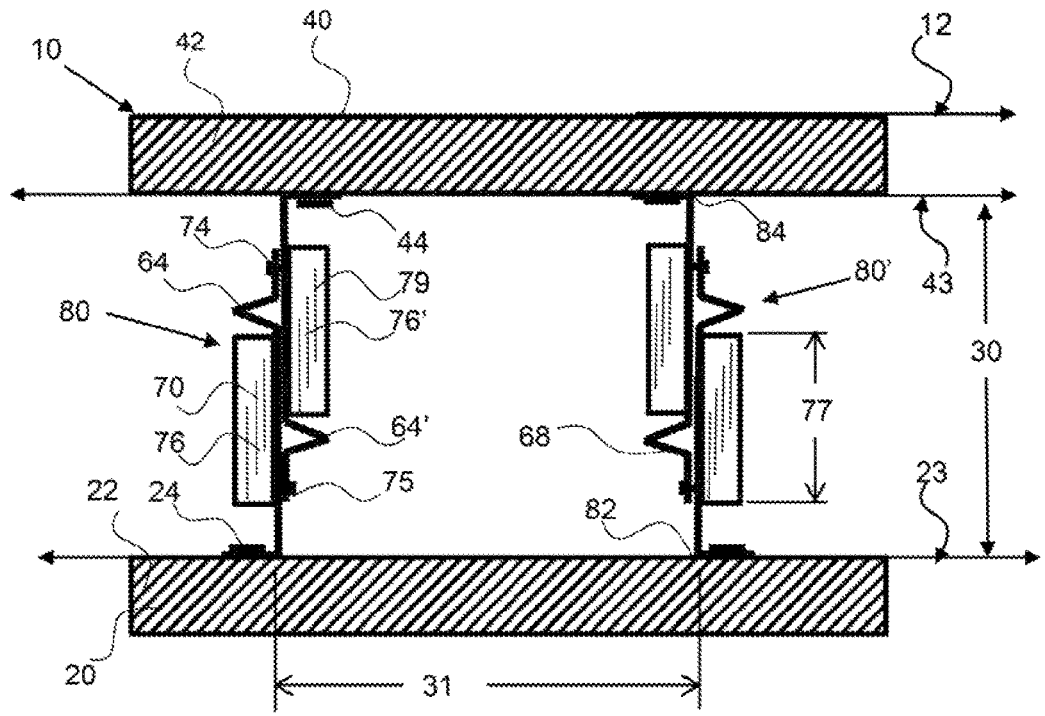
FIG. 3 shows a side view of a portion an exemplary linear actuator having a first and second base flexure extending between a base plate and an actuator plate.

As shown in FIG. 3, an exemplary linear actuator 10 has first and second base flexure 80, 80', extending between a base plate 22 and an actuator plate 42. The two flexures extend from a base plate end 82 to an actuator plate end 84. The base plate end 82 of the flexures is attached to the base plate 22 by a base plate attachment 24 and the actuator plate end is attached to the actuator plate 42 by an actuator plate attachment 44. These attachments may be screws, bolts, rivets, glue and the like. These fasteners secure the ends of the flexure to the plates of the base frame 20 and actuator frame 40. The offset distance between the base plate and the actuator plate 30 is shown. The base plate plane 23 and actuator plate plane 43 are shown and extend along the connection surface with the flexures. The base flexures extend in a direction substantially perpendicularly to the base and actuator plate planes. The offset distance between the two base flexures 31 is shown.

Figure 4:
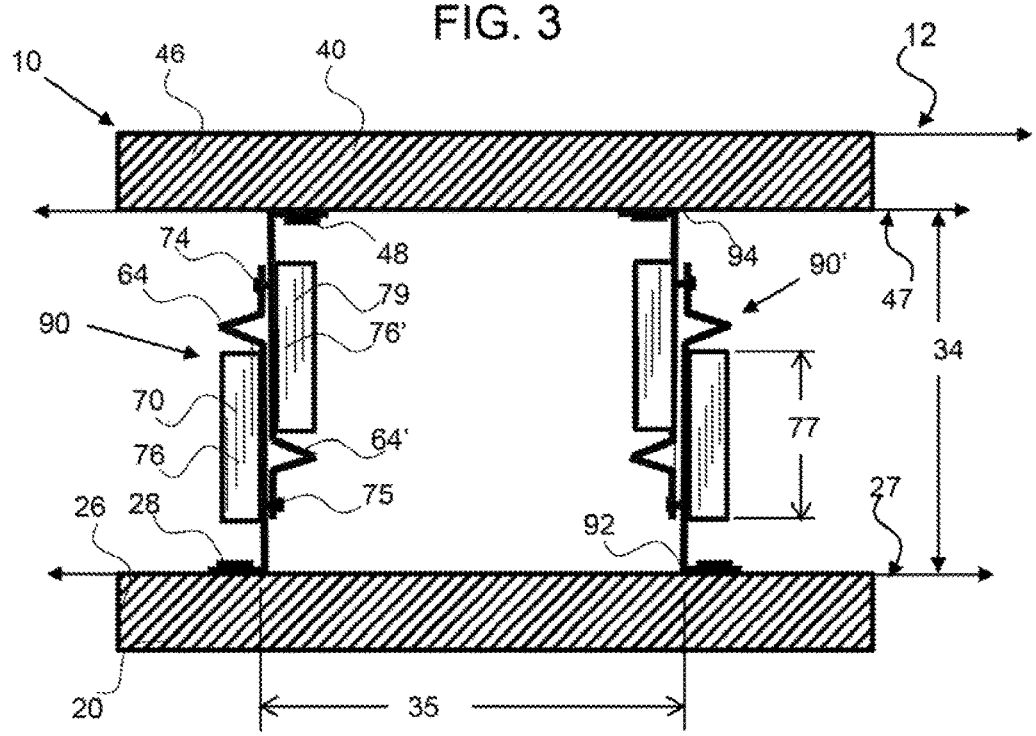
FIG. 4 shows a top down view of a portion an exemplary linear actuator having a first, and second am flexure extending between a base arm and actuator arm.

As shown in FIG. 4 an exemplary linear actuator 10 has a first and a second arm flexure 90, 90', extending between base arm 26 and an actuator arm 4 The two flexures extend from a base arm end 92 to an actuator arm end 94. The base arm end 92 of the flexures is attached to the base arm 26 by a base arm attachment 28 and the actuator arm 94 end is attached to the actuator arm 46 by an actuator arm attachment 48. These attachments may be screws, bolts, rivets glue and the like. These fasteners secure the ends of the arm flexures to the base frame 20 and actuator frame 40. The offset distance between the base arm and the actuator arm 34 is shown. The base arm plane 27 and actuator arm plane 47 are shown and extend along the connection surface with the flexures, or along the plane of the base and actuator arms. The arm flexures extend in a direction substantially perpendicularly to the base and actuator arm planes. The offset distance between the two arm flexures 35 is shown.

Figure 5:
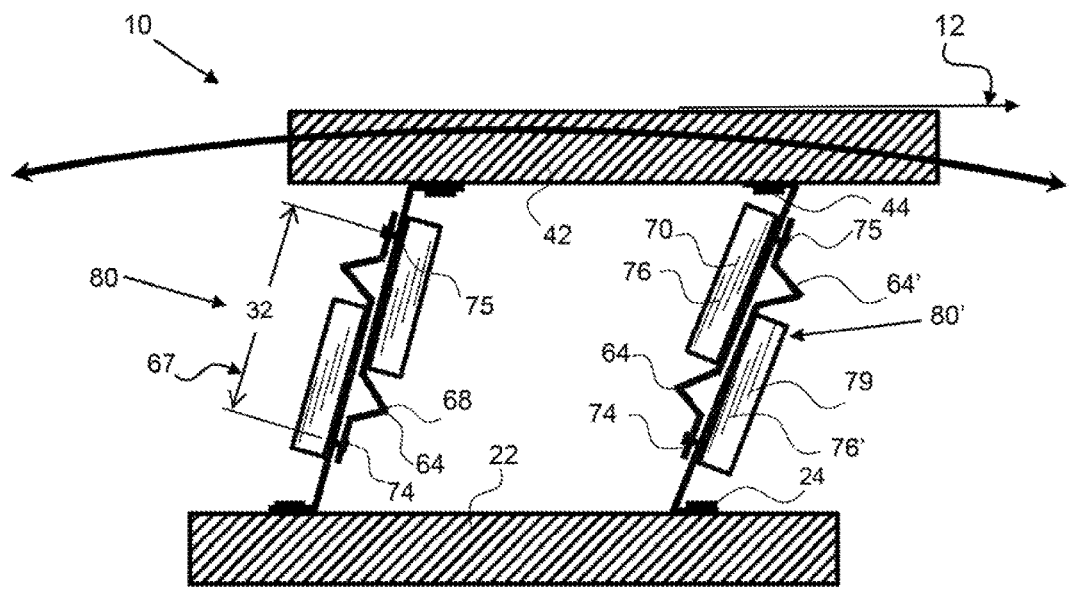
FIG. 5 shows a side view of a portion an exemplary linear actuator having a first and second base flexure extending between a base plate and an actuator plate, and actuated from a resting portion.

As shown in FIG. 5, a portion of an exemplary linear actuator 10, as described herein, comprises first and second base flexures 80, 80' extending between a base plate 22 and an actuator, plate 42, and is displaced from a resting position. The extension elements 64 are articulated open, or expanded from a bent configuration to allow the linear actuator to move in a linear axis of motion 12 for a relatively short distance. The extension elements comprise a bent or pleated portion of the flexure that creates a stored length 68. The stored length is, the length of flexure within the extension element, or the folded or pleated portion of the flexure. As the folded portion extends open, the length of the flexure is increased as the stored length is pulled out. With only two flexures extending in a parallel fashion between two plates however, the motion of the actuator plate 42 will take the shape of a radius upon further displacement, as indicated by the bold double arrow line. The distance 32 between the two flexure attachments 74, 75 or the length of the extension zone 67 is shown.

Figure 6:
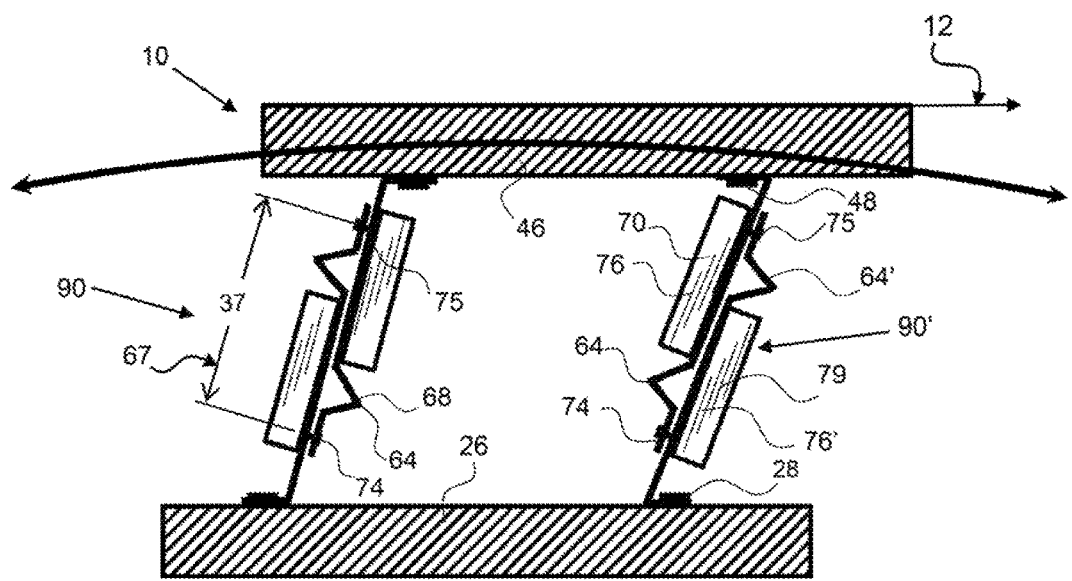
FIG. 6 shows a top down view of a portion an exemplary linear actuator having a first and second ami flexure extending between a base arm and actuator arm, and actuated from a resting portion.

As shown in FIG. 6, a portion of an exemplary linear actuator has first and second arm flexures 90, 90' extending between a base arm 26 and actuator arm 46, and actuated from a resting portion. Again, the extension elements 64 are articulated open, or expanded from a bent configuration to allow the linear actuator to move in a linear axis of motion over some range of motion. The distance 37 between the two flexure attachments 74, 75, or the length of the extension zone 67 is shown.

Figure 7:
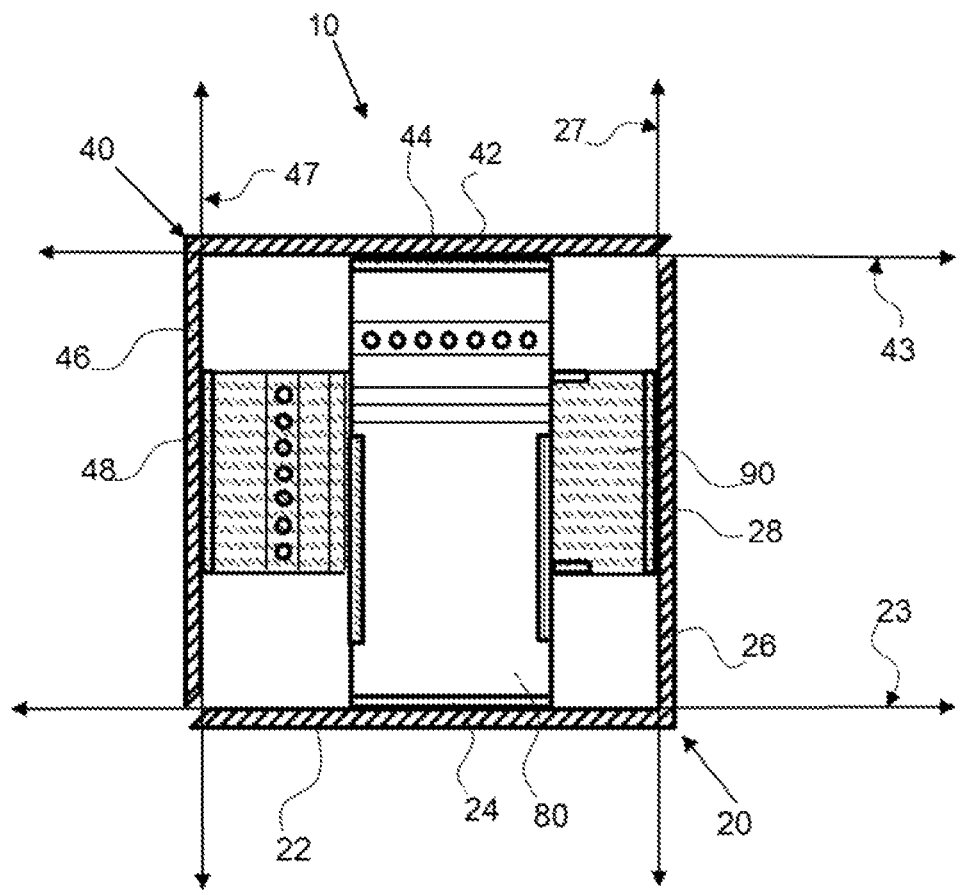
FIG. 7 shows an end view of an exemplary linear actuator having a base flexure and an arm flexure extending orthogonally to each other.

As shown in FIG. 7, an exemplary linear actuator 10 has a base flexure 80 and an arm flexure 90 extending orthogonally to each other. The base flexure extends and is attached to the base plate 22 of the base frame 20 and the actuator plate 42 of the actuator frame 40. The base flexure extends substantially perpendicular to the base plate plane 23 and actuator plate planes 43. The arm flexure 90 extends between and is attached to the base arm 26 and the actuator arm 46. This orthogonal orientation of the two flexures forces the base flexure to more and extend the extension elements to provide a planar linear motion of the actuator plate when forced along the axis of motion.

As shown in FIG. 8, an exemplary base flexure 81 of the present invention has a first flexure component 70 and a second flexure component 79. The stiffeners 76, 76' for the first flexure component 70 are shown as well as a stiffener 76" of the second flexure component 79. The stiffeners are shown as bent portions of the sheet material, wherein the stiffener is bent to extend substantially perpendicularly to the body 85 of the flexure. The body 85 of the flexure comprises the planar portion of the flexure, as shown, that extends between one of the base frame or actuator frame and the extension element. The ends of the flexure, base plate end 82 and actuator plate end 84, are also bent portion of the sheet material, and comprise apertures 83 for retaining a fastener. The extension element 64 is also a bent portion of the flexure, wherein the flexure is folded to store length. The bent portion of the flexure can open due to tension and extend the length of the flexure. The second flexure component 79 has an extension element 64' that is offset from extension element 64 of the first flexure component and extend from the flexure in an opposing direction to the plane of the flexure. The extension elements 64 and 64' extend parallel to each other across width 63 of the flexure.

As shown in FIG. 9, the flexure 60 has a width 63 that extends perpendicular to the length axis 62 of the flexure. The length axis or a flexure is the axis that extends between the base frame and the actuator frame for both the base and arm flexures.

As shown in FIG. 10, an exemplary flexure 60 of the present invention has apertures 83 on the flexure end for attachment to a plate or arm.

Figure 11:
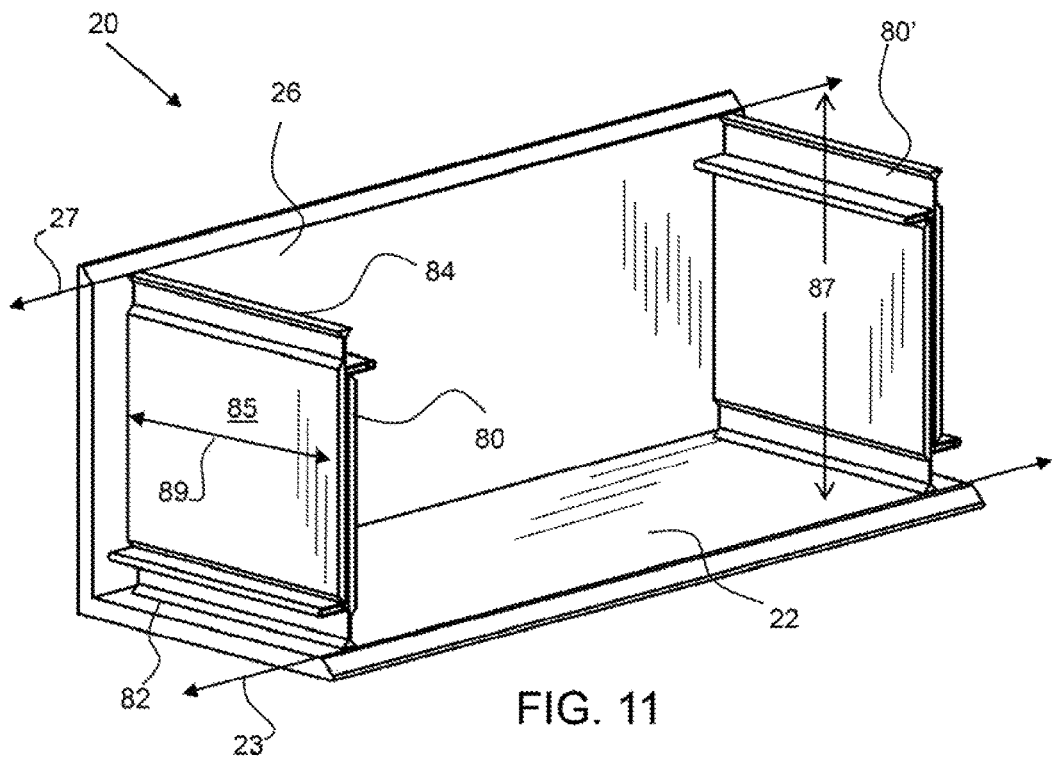
FIG. 11 shows a perspective view of an exemplary base frame of the present invention.

As shown In FIG. 11, an exemplary base frame 20 of the present invention has a base plate 22 and a base arm 26 that extends perpendicular to the base plate. The base arm extends from one end of the base arm but it is to be understood that the base may extend past the base arm for securing the base to a support structure, for example. The base frame shown is an elbow having a right angle geometry between the base plate and base arm. The base plate end 82 of the two base flexures 80 are attached to the base plate 22 and the base flexures extend up along the length axis 87 from the base plate. The actuator plate ends 84 of the flexures is not attached but is configured to be attached to the actuator plate. The body of the base flexure 85, or base body plane 89 extends perpendicularly to the base plate plane 23 and the base arm plane 27.

Figure 12:
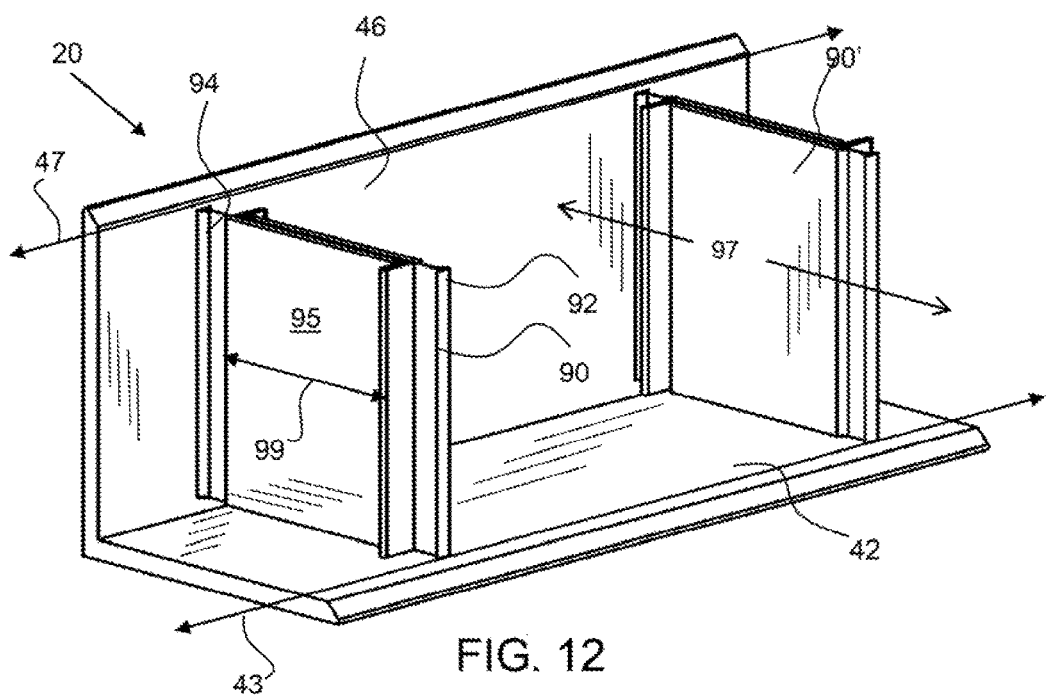
FIG. 12 shows a perspective view of an exemplary actuator frame of the present invention.

As shown in FIG. 12, an exemplary actuator frame 40 of the present invention has an actuator plate 42 and an actuator arm 46 that extends perpendicular to the actuator plate. Two arm flexures $0 are attached to the actuator arm 46 and extend up along the length axis 97 from the actuator arm 46.

The base arm end 92 of the two flexures is not attached, but is configured to be attached to the base arm 28, shown in FIG. 11. The body of the base flexure 95, or base body plane 99 extends perpendicularly to the actuator arm plane 47 and the actuator plate plane 43.

Figure 13:
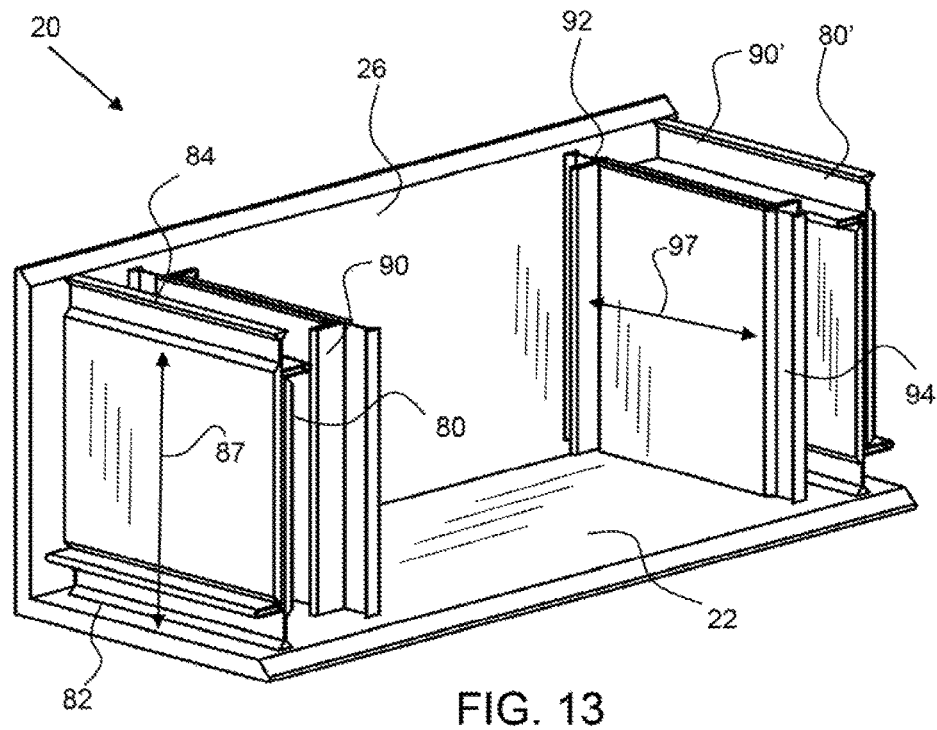
FIG. 13 shows a perspective view of an exemplary base frame of the present invention having base flexures attached to the base plate and the arm flexures attached to the base arm.

As shown in FIG. 13, an exemplary base frame 20 of the present invention has base flexures 80,80' attached to the base plate 22 and arm flexures 90, 90' attached to the base arm 26. The base flexures are configured outside of the arm flexures, with respect to the center of the base frame. The base flexures extend orthogonally to the arm flexures. Put another way, the length axis 87 of the base flexure 80, or axis between connecting ends of the base flexures, extends perpendicularly to the length axis 97 of the ami flexures 90.

Figure 14:
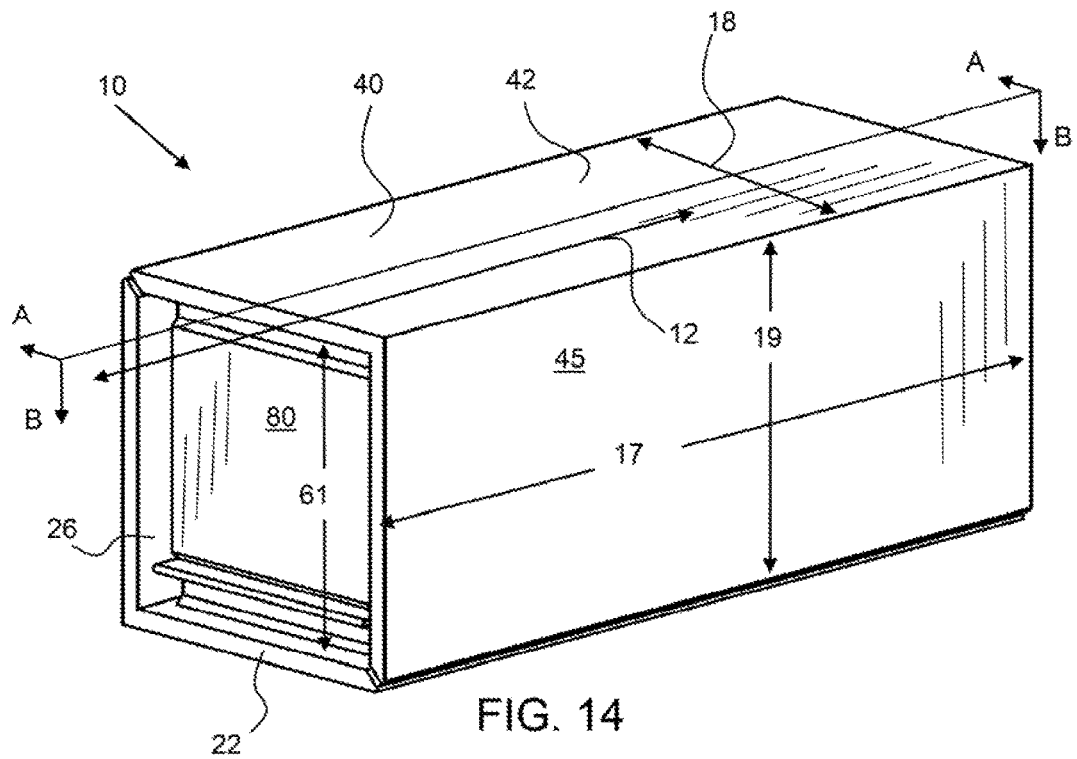
FIG. 14 shows a perspective view of an exemplary linear actuator having a base frame and an articulating frame.

As shown FIG. 14, an exemplary linear actuator 10 has a base frame 20 and an articulating frame 40 that enclose the flexures therein. The base plate 22 and actuator plate 42 are offset and parallel to each other, and offset by the length 61 of the base flexure 80. The base arm 26 and actuator arm 46 are offset and parallel to each other, and offset by the length of the arm flexures, not shown. The length 17, width 18, and height 19 of the linear actuator is shown. The axis of motion 12 is shown and the actuator frame will move in a linear motion along this axis.

Figure 15:
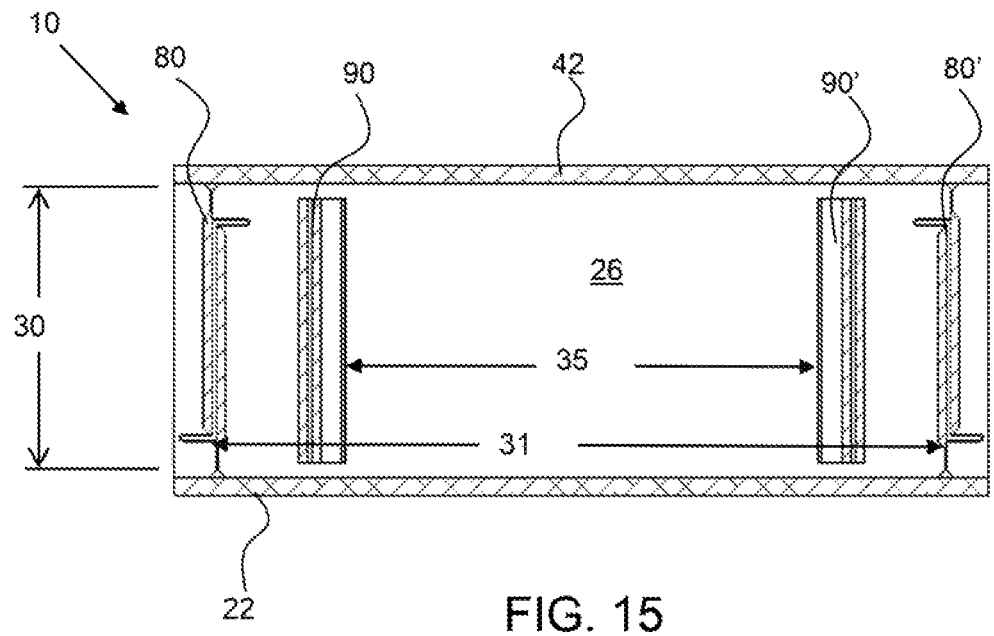
FIG. 15 shows a cross-sectional view of the linear actuator shown FIG. 14 along line A-A, having the base flexures configured outside of the arm flexures.

As shown in FIG. 15, the exemplary linear actuator 10 shown in FIG. 14 along line A-A, has the base flexures 80 configured outside of the arm flexures 90. The offset distance between the two arm flexures 35, and the offset distance between the two base flexures 31 is shown.

Figure 16:
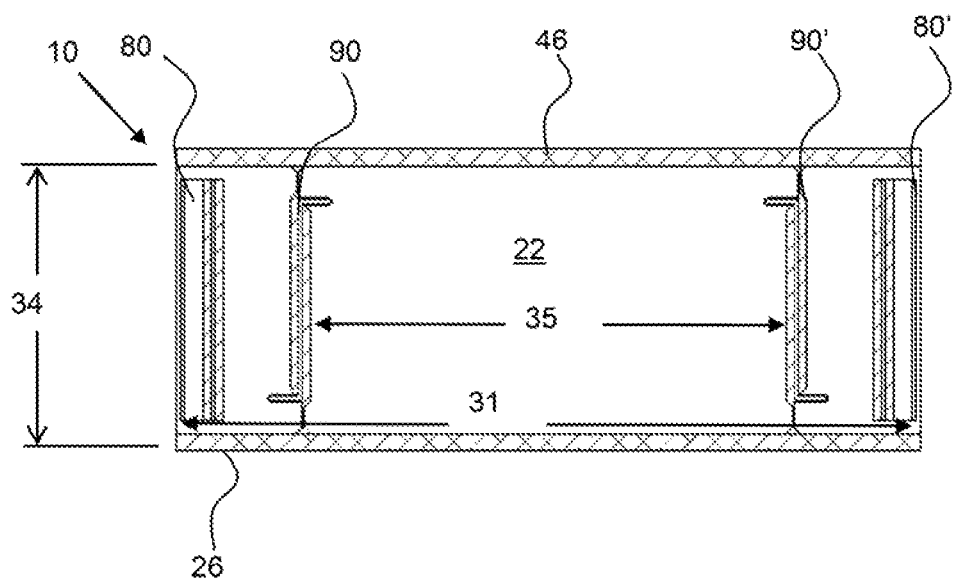
FIG. 16 shows a cross-sectional view of the linear actuator shown in FIG. 14 along line B-B, having the base flexures configured outside of the arm flexures.

As shown in FIG. 16, the linear actuator shown in FIG. 14 along line B-B, has the base flexures 80 <configured outside of the arm flexures 90.

Figure 17:
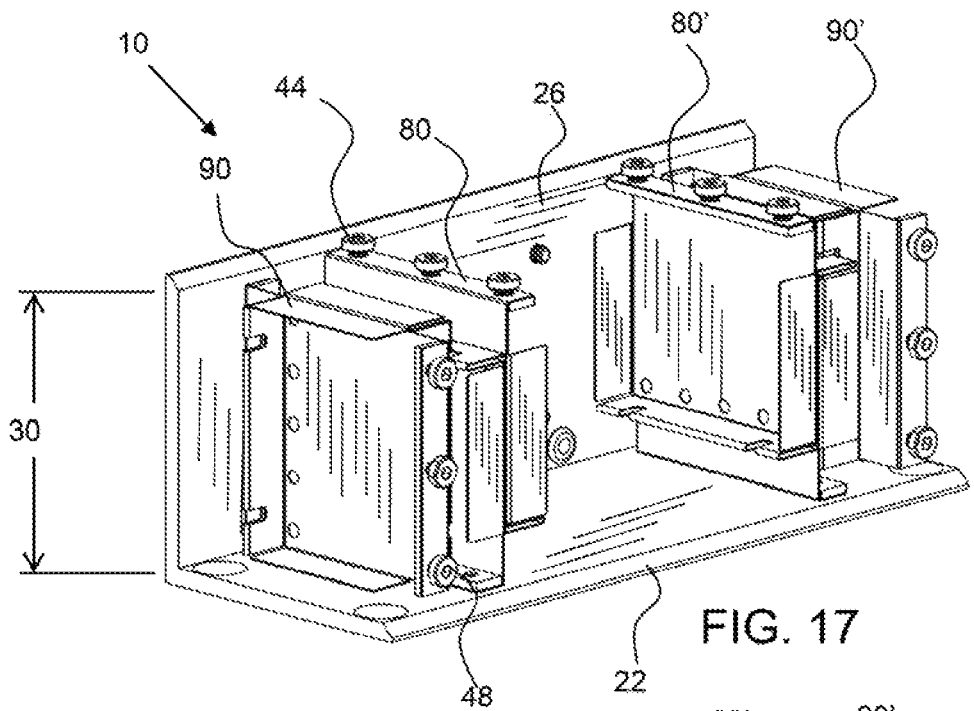
FIG. 17 shows a perspective of a base frame portion of the present invention having the base flexures configured inside of the arm flexures.
Figure 18:
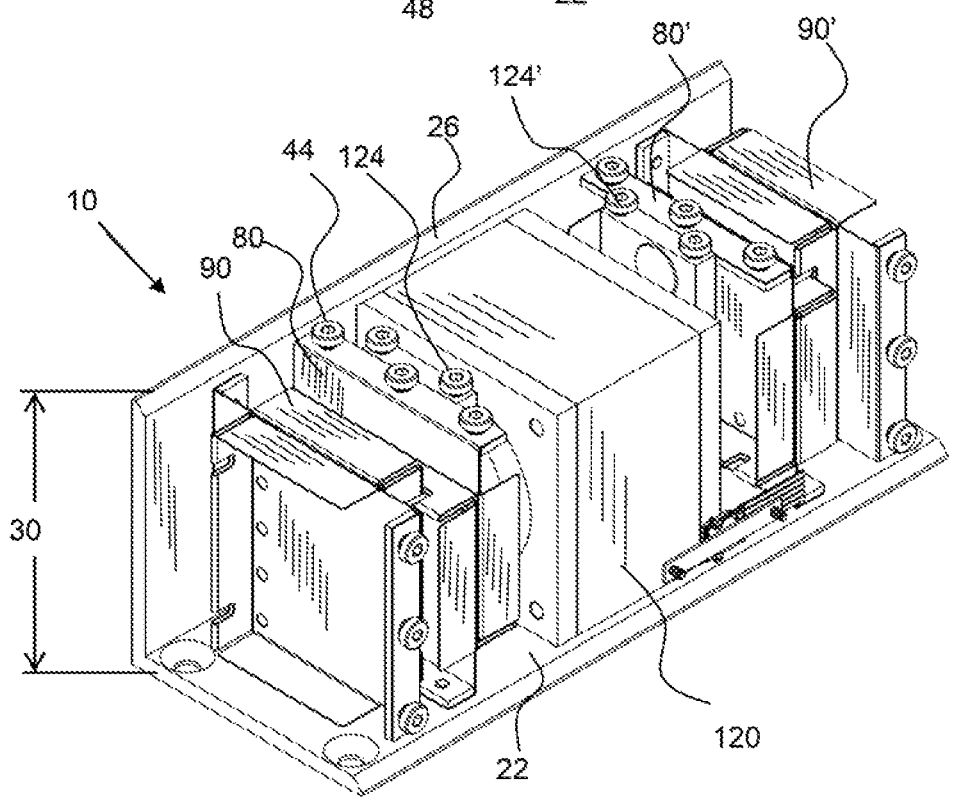
FIG. 18 shows a perspective view of a base frame portion of the present invention having a motor configured between the two base flexures and mounted to the base plate.

As shown in FIG. 17, an exemplary base frame 20 portion, of the present invention has the base flexures 80 configured inside of the arm flexures 90. The base flexures are configured orthogonally to the arm flexures. The actuator plate attachments 44 as well as the actuator arm attachments 48 are shown. The offset distance 30 between the base plate and actuator plate is shown.

Figure 19:
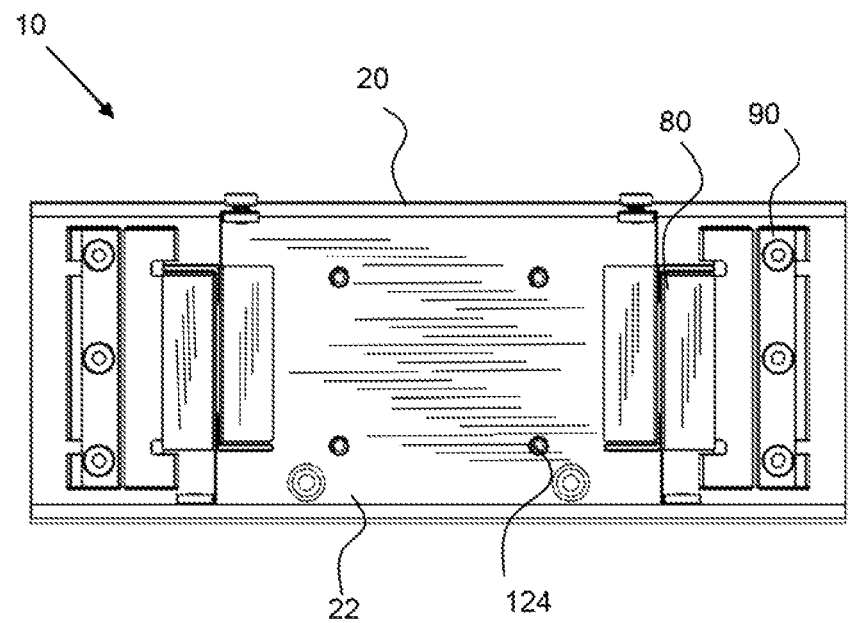
FIG. 19 shows a side view of the base frame shown in FIG. 17.

As shown in FIG, 18, an exemplary base frame 20 portion of the present invention has an actuator 120 configured between the two base flexures and mounted to the base plate. The actuator may be an electric motor that is attached to the base and has an actuator that is attached to the actuator frame, either to the actuator plate or to the actuator arm. As shown in FIG. 19, an exemplary base frame 20 has actuator attachments 124 configured in the base plate 22. The actuator may be securely attached to the base, such as to the base plate or base arm. It may be preferred to attach the actuator to the base plate as this may be more stable and provide less vibration.

Figure 20:
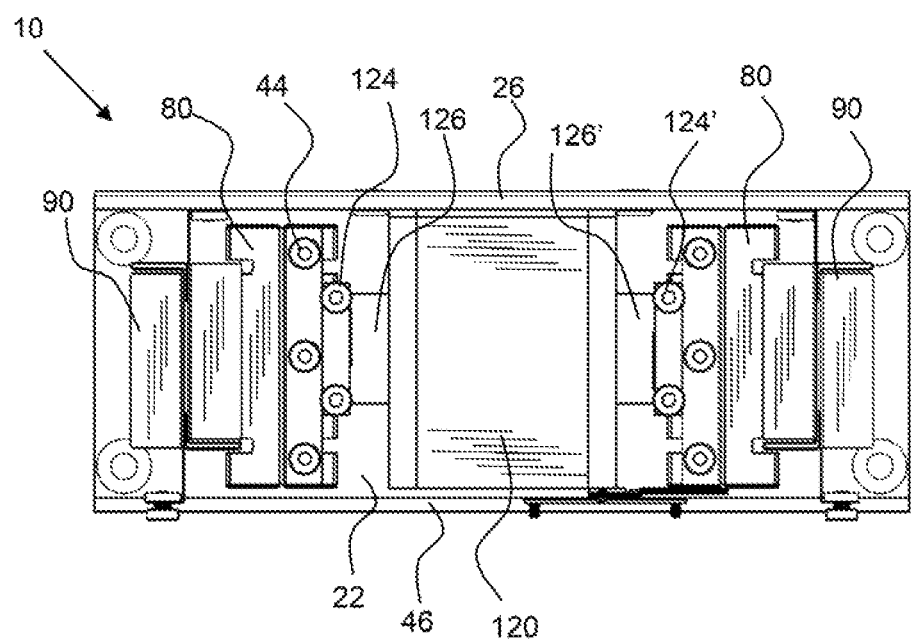
FIG. 20 shows a top-down view of the base frame shown in FIG. 18.

As shown in FIG. 20, an actuator 120 is configured between the flexures and within the linear actuator cavity, or area formed between the base frame and actuator frame. The actuator has two actuating elements that extend from opposing sides of the actuator and are configured for attachment to the actuator frame by actuator attachments 124, 124'. The actuating elements may extend from the actuator in opposing direction to move the actuator frame back and forth.

Figure 21:
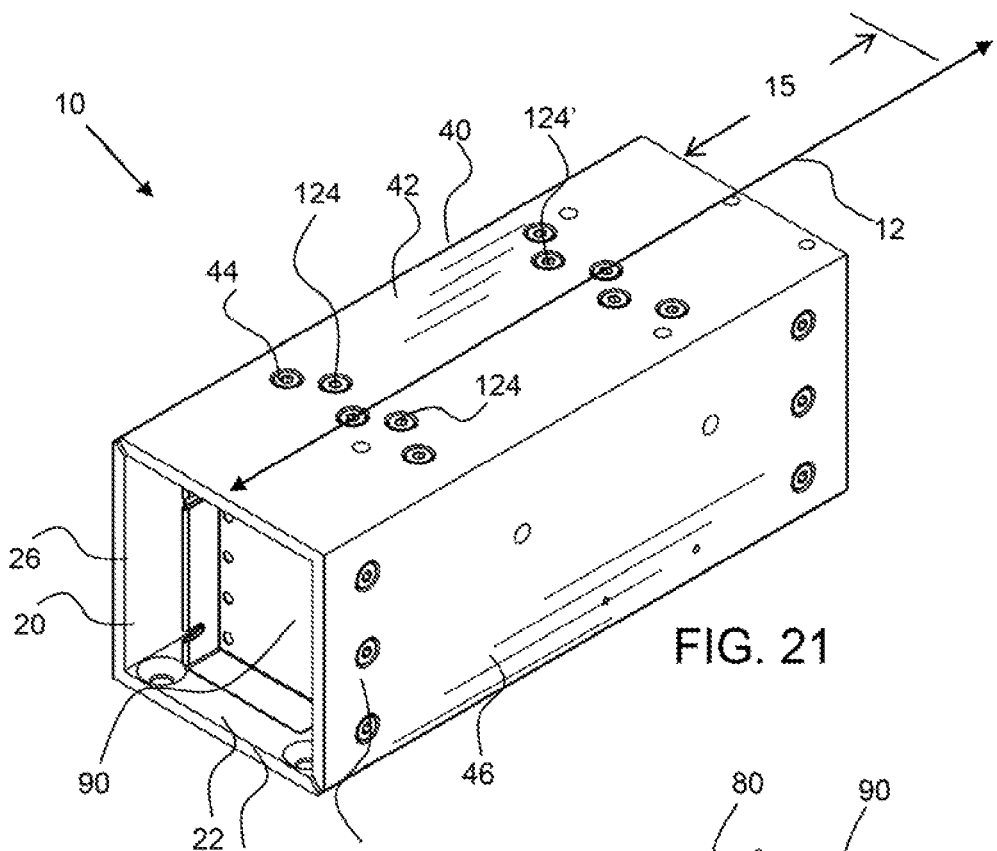
FIG. 21 shows a perspective view of an exemplary linear actuator.
Figure 22:
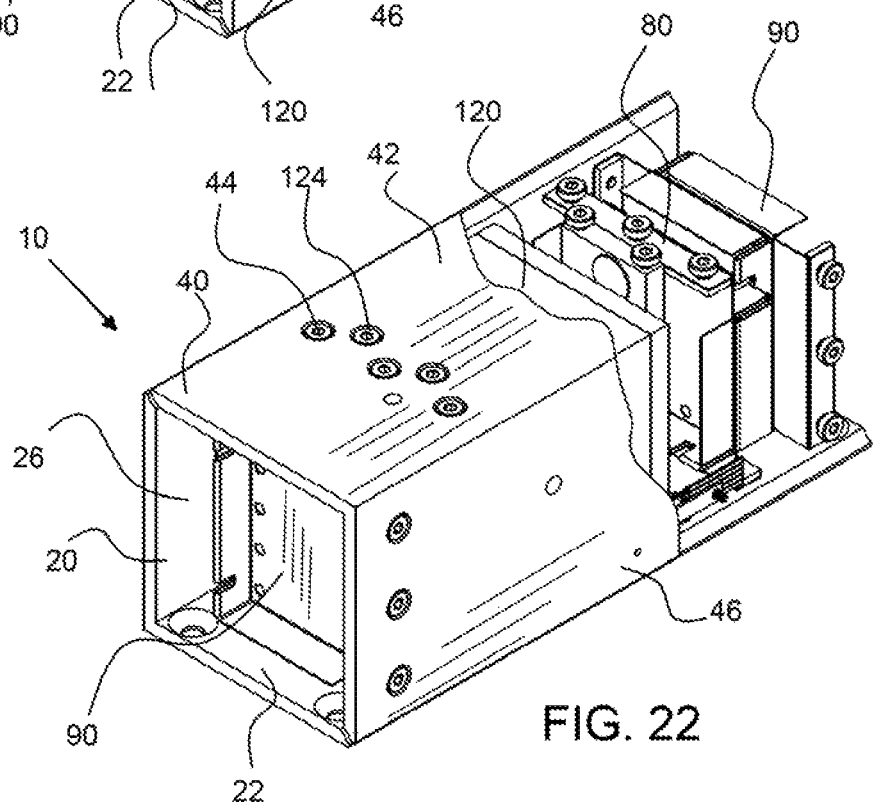
FIG. 22 shows a perspective cur-away view the 1 near actuator shown in FIG. 21.

Referring now to FIGS. 21 and 22, an exemplary linear actuator 10 configured to provide linear motion over a linear displacement region 15, or a displacement offset from a resting position wherein the actuator plate 42 moves substantially parallel in the axis of motion 12. A linear displacement region 15, or a region wherein the actuator plate moves in a planar direction along the axis of motion, may be a proportion of the length 61 of the flexure 60, as shown in FIG. 1. An actuator may comprise a single actuating element that is attached to the actuator frame to either the actuator plate or arm, or to one of the base flexures.

Figure 25:
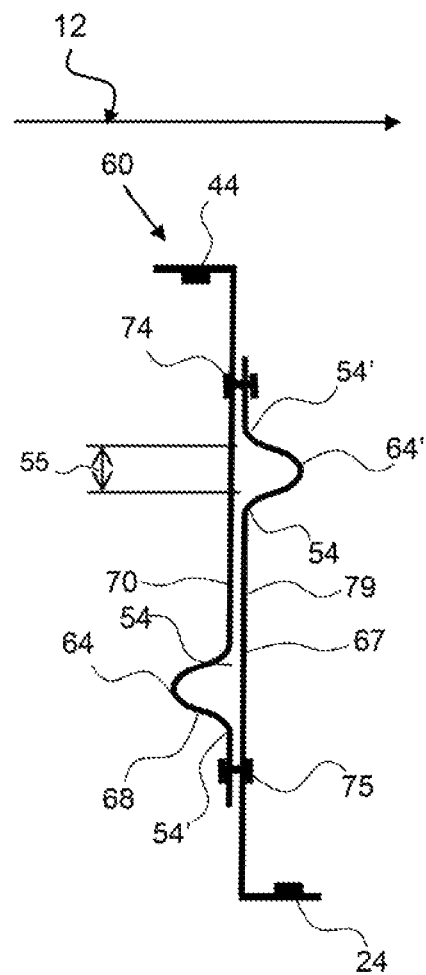
FIG. 25 shows a side view of an exemplary flexure portion of the present invention having first and second flexure components having continuously curved extension elements.

As shown in FIG. 23 and FIG. 24, an exemplary flexure portion 60 comprises first and second flexure components 70, 79, each having a rounded or curved extension elements 64 64'. The extension elements shown in FIG. 23 and FIG. 25 are arced or curved shaped, with no sharp bends or folds, which may be more preferred as it may reduce any stress concentrations along the extension element. The extension element in FIG. 23 has straight portions that lead to an arced or curved return portion, that may be defined by a radius, wherein the extension element is bent back toward the flexure component. The extension element in FIG. 24 has a circular shape from the connected ends 54, 54' of the extension element. When moving in the axis of motion 12, the connected end 54', may move away from connected end 54 to increase the extension gap 55 and enable a larger range of motion of the flexure. Connected end 54' is closer to the flexure attachment, 74 or 75 and connected end 54 is, coupled to the extension zone 67, or the portion of the flexure component within the extension zone. A portion of the flexure component from the plate attachments 24, 44, may be linear up to the extension element, or a first connected end 54 of the extension element 64 and may be linear from the second connected end 54' of the extension element to the end of the flexure component or to the flexure attachment 74, 75 as shown. The stored length 68 of the extension element is length between the first and second connected ends 54, 54', and this stored length allows the connected ends to separate from each other when the flexure is displaced from a neutral position, to increase the gap 55 distance. Under extreme displacement, the extension element may be extended to, a substantially straight orientation, wherein it is substantially aligned with the flexure component in the extension zone; which would be the maximum extension of the extension element.

As shown in FIG. 25, the first and second flexure components 70,79 have continuously curved extension elements 64, 64', wherein the extension element has a curved geometry between the connected ends 54, 54' and a curved geometry between the extension elements and the flexure component, whereby the connected ends are curved or have a radius. There are no sharp bends in these flexure components, which may lead to higher cycle life, as the stresses are not concentrated in a sharp bend or fold.

It will be apparent to those skilled in the, art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What claimed is:
1. A linear actuator comprising:
 a) a base frame comprising a base plate and a base arm;
  wherein said base arm extends substantially perpendicularly from the base plate;
 b) a actuator frame comprising an actuator plate and an actuator arm;
  wherein said actuator arm extends substantially perpendicularly from the actuator plate and towards the base plate;

wherein the base plate and the actuator plate extend substantially parallel with each other at an offset distance from each other,
wherein the base arm and the actuator arm extend substantially parallel with each other at an offset distance from each other;
c) a set of base flexures extending between the base plate and the actuator plate comprising:
a first base flexure;
a second base flexure;
wherein each of said base flexures comprise
a length and a length axis,
wherein the length axis of the base flexures extends along the length of said base flexures from the base plate to the actuator plate;
d) a set of arm flexures extending between the base arm and the actuator arm comprising:
i) a first arm flexure;
ii) a second arm flexure:,
wherein each of said arm flexures comprise:
an arm flexure length and length axis
wherein the length axis of the arm flexures extends along the length of said arm flexures from the base arm to the actuator arm;
wherein the set of base flexures extend substantially orthogonally to the set of arm flexures;
wherein the length axis of the base flexures is orthogonal to the length axis of the arm flexures; and
whereby the actuator plate moves substantially linearly along a axis of motion that is parallel with a base plate.

2. The linear actuator of claim 1, wherein each of the base flexures and each of the arm flexures comprise an extension element.

3. The linear actuator of claim 2, wherein the extension element comprises a bent portion of the flexure.

4. The linear actuator of claim 2, wherein the extension element comprises a folded portion of the flexure.

5. The linear actuator of claim 2, wherein each of the flexures comprises a first flexure component and a second flexure component that are attached to each other by a flexure attachment.

6. The linear actuator of claim 5, wherein the first flexure component is attached to the second flexure component at a first attachment and a second attachment, and wherein the extension element is configured between the first and second flexure attachments.

7. The linear actuator of claim 6, wherein each of the first and second flexure components comprise an extension element configured between the first and second flexure attachments.

8. The linear actuator of claim 7, wherein the flexure comprises an extension zone between the first and second attachments; where in the extension element of the first flexure component is configured on a first end of the extension zone, and the extension element of the second flexure component is configured on a second end of the extension zone.

9. The linear actuator of claim 7, wherein at least some of the flexures comprise a stiffener.

10. The linear actuator of claim 9, wherein the stiffener comprises a bent portion of a flexure that extends orthogonally to a length axis of said flexure.

11. The linear actuator of claim 1, wherein at least some of the flexures comprise a stiffener.

12. The linear actuator of claim 11, wherein the stiffener comprises a bent portion of a flexure that extends orthogonally to a length axis of said flexure.

13. The linear actuator of claim 11, wherein the base, plate and base arm extend around the flexure elements to create an enclosure around the flexures.

14. The linear actuator of claim 1, wherein the linear displacement region is least 25% of the length of the base flexures.

15. The linear actuator of claim 1, further comprising an actuator device configured between the base frame and actuator frame.

16. The linear actuator of claim 15 wherein the actuator device is an electric motor.

17. The linear actuator of claim 15, wherein the actuator device has a first actuating element coupled to actuator plate on a first side of the actuator device and a second actuating element coupled to the actuator plate on a second and opposing to first side, of the actuator device.

18. The linear actuator of claim 1, wherein the base flexures are configured inside of the arm flexures along an axis of motion of the linear actuator.

19. The linear actuator of claim 1, wherein the extension element comprise a folded portion of the flexure.

20. The linear actuator of claim 1, wherein the extension element has curved shape between a first connected end and a second connected end.

21. A linear actuator comprising:
a) a base frame comprising a base plate and a base arm;
wherein said base plate arm extends substantially perpendicularly from the base plate;
b) an actuator frame comprising an actuator plate and an actuator arm;
wherein said actuator arm, extends substantially perpendicularly down from the actuator plate and, towards the base plate;
wherein the base plate and the actuator plate extend substantially parallel with each other at an offset distance from each other;
wherein the base arm and the actuator arm extend substantially parallel with each other at an offset, distance from each other;
c) a set of base flexures extending between the base plate and the actuator plate comprising:
i) a first base flexure;
ii) a second base flexure;
wherein each of said base flexures comprise:
a first flexure component and a second flexure component each comprising an extension element, wherein said first and second flexure components are attached to each other by a first and second flexure attachment that are offset by a flexure attachment offset length; and wherein the extension elements are configured between the first and second flexure attachments:
an extension zone between the first and second attachments; wherein the flexure attachment offset length extends when the flexure is put in tension;
a length and a length axis,
d) a set of arm flexures extending between the base arm, and the actuator arm comprising:
a first arm flexure:
ii) a second arm flexure;
wherein each of said am flexures comprise:
a first flexure component and a second flexure component each comprising an extension element, wherein said first and second flexure components are attached to each other by a first and second flexure attachment that are offset by a flexure attachment offset length; and wherein the extension element is configured between the first and second flexure attachments;

an extension zone between the first and second attachments; wherein the flexure attachment offset length extends when the flexure is put in tension;

an arm flexure length and length axis wherein the set of base flexures extend substantially orthogonally to the set of arm flexures;

wherein the length axis of the base flexures is orthogonal to the length axis of the arm flexures; and whereby the actuator plate moves substantially linearly along an axis of motion that is parallel with a base plate.

* * * * *